US009755559B2

United States Patent
Tam et al.

(10) Patent No.: US 9,755,559 B2
(45) Date of Patent: Sep. 5, 2017

(54) VIBRATOR MOTOR SPEED DETERMINATION IN A MOBILE COMMUNICATIONS DEVICE

(71) Applicant: Apple Inc., Cupertino, CA (US)

(72) Inventors: Ching Yu John Tam, Cupertino, CA (US); Ryan Jeffrey Du Bois, Cupertino, CA (US); Chanh-Duy Nguyen Tran, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/339,671

(22) Filed: Jul. 24, 2014

(65) Prior Publication Data

US 2014/0333235 A1 Nov. 13, 2014

Related U.S. Application Data

(63) Continuation of application No. 12/794,542, filed on Jun. 4, 2010, now Pat. No. 8,793,094.

(51) Int. Cl.
*H02P 25/06* (2016.01)
*H04M 1/24* (2006.01)
(Continued)

(52) U.S. Cl.
CPC .......... *H02P 25/027* (2013.01); *H02P 25/032* (2016.02); *H04M 1/24* (2013.01)

(58) Field of Classification Search
CPC ........ H02P 25/027; H02P 25/06; H04M 1/24; G09G 5/00
See application file for complete search history.

(56) References Cited

U.S. PATENT DOCUMENTS

2006/0119573 A1\* 6/2006 Grant .................... B06B 1/0215
345/156
2007/0032270 A1 2/2007 Orr
(Continued)

FOREIGN PATENT DOCUMENTS

EP 1686776 4/2007

OTHER PUBLICATIONS

Basseville, Michele, "On-Board Component Fault Detection and Isolation Using the Statistical Local Approach", Institut de Recherche en nformatique et systemes Aleatoires (IRISA), Publication Interne No. 1122, Sep. 1997, ISSN: 1166-8687 (41 pages).
(Continued)

*Primary Examiner* — Toan Le
(74) *Attorney, Agent, or Firm* — Brownstein Hyatt Faber Schreck, LLP

(57) ABSTRACT

One embodiment relates to testing and verifying vibrator motor operation during manufacturing of a device and during in-the-field use. The test relies on an integrated motion sensor or other mechanical measurement circuitry, such as, for example, an accelerometer. In one embodiment, a speed determination for a vibrator motor performance during initial manufacture of the device. Subsequently, when vibration is detected during the in-the-field use, the vibration may be sampled using the integrated mechanical measurement circuitry. Once sampled, a speed may be determined based on a resonance of the sampled signal. Over time, the various speed determinations for the vibrator motor may be analyzed to determine an overall health of the vibrator motor. A threshold for detecting when the overall health of the vibration motor over time has degraded may be predetermined. A notification of a degradation of vibrator motor performance is sent to either a manufacturer or user of the
(Continued)

mobile communications device. Other embodiments are described and claimed.

16 Claims, 6 Drawing Sheets

(51) Int. Cl.
    *H02P 25/02*          (2016.01)
    *H02P 25/032*        (2016.01)

(56) References Cited

U.S. PATENT DOCUMENTS

| | | |
|---|---|---|
| 2008/0132196 A1 | 6/2008 | Soh et al. |
| 2009/0072768 A1 | 3/2009 | Murray et al. |
| 2009/0096406 A1 | 4/2009 | Flickinger et al. |
| 2009/0265138 A1 | 10/2009 | Liu et al. |
| 2012/0232780 A1* | 9/2012 | Delson .................. A63F 13/06 701/400 |

OTHER PUBLICATIONS

Halmai, Attila, et al., "New Linear-Electromagnetic Actuator Used for Cellular Phones," Research Article, Periodica Polytechnica, Mechanical Engineering 51/1 (2007), DOI: 10.331/pp.me 2007-1.03, web: http://www.pp.bme,hu/me (pp. 19-22).

Li, Chang et al., "Application of Wavelet Analysis in Fault Detection of Cell Phone Vibration Motor," International Asia Conference on Informatics in Control, Automation and Robotics, 2009, IEEE Computer Society, DOI: 10.1109/CAR.2009.108 (pp. 473-477).

\* cited by examiner

VIBRATOR MOTOR SPEED DETERMINATION IN A MOBILE COMMUNICATIONS DEVICE

CROSS-REFERENCE TO RELATED APPLICATION

This application is a continuation of U.S. patent application Ser. No. 12/794,542, entitled "Vibrator Motor Speed Determination in a Mobile Communications Device," filed on Jun. 4, 2010, now U.S. Pat. No. 8,793,094, which is incorporated by reference in its entirety as if fully disclosed herein.

TECHNICAL FIELD

An embodiment relates to mobile communications devices that include a vibrator motor, and techniques for vibrator motor speed determination. Other embodiments are also described.

BACKGROUND

Mobile phones generally use vibration as a means for informing the user of incoming calls. The silent alert provided by vibration is helpful in instances where an alerting sound is inappropriate, or where an alerting sound is inadequate. Thus, tactile sensation is used to notify the mobile user of calls or other events, such as alarms, calendar reminders, etc.

Many mobile phones use eccentric mass vibrator motors for silent alerts. Eccentric mass vibrator motors are driven at a single direct current (DC) voltage in mobile phone handsets. Internal variation in the vibrator motor may cause the speed of one motor (at the phone's drive voltage) to rotate at a different speed than another vibrator motor from the same manufacturer. In fact, as eccentric mass vibrators are used, they may wear, which causes the motors to vary from an initial speed.

Humans are sensitive to different frequency ranges of vibration. Vibration increases as rotational speed increases. Beyond a certain rotational speed, however, the human perception of vibration diminishes. Thus, if a target rotational speed can be identified for a given vibrator/phone, it would be optimum if the vibrator motor functioned at or near this rotational speed.

SUMMARY

One embodiment described relates to testing and verifying vibrator motor operation during manufacturing and in-the-field use of a mobile communications device, such as a mobile phone. In one embodiment, vibrator motor operation is evaluated based on a speed determination for the vibrator motor. A test/verification of vibrator motor performance may rely on an integrated motion sensor or other mechanical measurement circuitry within the device, such as, for example, an accelerometer. By using the mechanical measurement circuitry that is integrated within a mobile communications device, an external structure is not required to house mechanical measurement circuitry making testing much more cost effective both at the time of manufacturing test and in-the-field. In one embodiment, a speed determination for a vibrator motor is performed during initial manufacture of a mobile communications device, to perform an initial calibration or check of the motor and its associated control electronics. A vibrator motor is replaced if the speed determination falls outside an expected speed range. Otherwise, the vibrator motor speed may be stored within the device to provide a baseline vibrator motor speed.

Subsequently, when vibration is detected during in-the-field use, vibrations from a running vibrator motor may be sampled using the mechanical measurement circuitry integrated within the mobile communications device. In one embodiment, the vibration is measured by sampling an output data of a motion sensor at, for example, 1 kHz. A frequency may then be determined from the sampled data using, for example, a fast fourier transform to obtain a frequency spectrum of the vibration. Based on the determined frequency spectrum, a revolution per minute (RPM) value may be determined by an amplitude versus frequency graph of the sampled signal. An RPM value is used as the speed measured for a rotary vibrator motor; a rotary vibrator motor is, however, just one example embodiment.

In a further embodiment, the vibrator motor uses a linear-type motor, which may include a weight hung by springs excited by a magnetic field. A speed value associated with such a linear-type vibrator motor would also be determined by using the built-in accelerometer of a mobile communications device, to measure the resonance of a vibrator causing a vibration event. The measured resonance may be used to determine an amplitude or other like measure of the vibrator. The measured speed values of a vibrator, whether rotary or linear, are stored within non-volatile memory so that a quantitative measure of vibrator motor performance is available during subsequent in-the-field testing.

In one embodiment, an optimal resonance of a linear vibrator is determined by sweeping the drive frequency on the linear vibrator (e.g., 100 Hz to 200 Hz). During the sweep, a fast Fourier transform may be applied to the sampled output data sequence from an integrated accelerometer, and the resulting frequency spectrum is analyzed to determine the frequency of the vibration. A peak magnitude of the fundamental frequency may also be identified as the vibrator frequency sweeps to determine the optimal (strongest) vibration force. A manufacturer of a linear vibrator could have different resonance frequencies sweeping low to high or high to low. It is beneficial to sweep vibrator frequency in both directions to measure rising and falling frequency resonance. In one embodiment, a calculated average resonance frequency is selected as the optimal frequency, based on the measured rising and falling frequency resonance, to drive the linear vibrator.

During in-the-field use, speed values may be measured over time and stored within the non-volatile memory of the mobile communications device. Analysis of the various speed determinations stored within memory may then indicate a degradation in vibrator performance over time, such as in situations where measured speed values are varying from an expected speed value by a predetermined threshold, for example, more than + or − twenty percent (20%) of the initial or factory-measured value.

When the motor falls outside of the predetermined performance threshold range such a detected degradation of vibrator motor performance may be reported. The degradation described refers to in-the-field use or normal use by an end user of the mobile communications device. The degradation may be reported to the user as an audio or visual alert being given in the mobile device (e.g., a pop-up window appearing on the display screen of the device with explanatory text). In addition, an alert message may be generated and transmitted to the manufacturer via a wireless network connection.

Over time the various speed determinations for the vibrator motor may be analyzed to determine an overall health of the vibrator motor. A stored baseline vibrator motor speed may provide a threshold for examining or establishing the overall health of the vibration motor. In one embodiment, any degradation of vibrator motor performance is reported, to indicate that the vibrator motor may require replacement depending on the degree of degradation, e.g. depending on how far the current measured speed is from its baseline.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
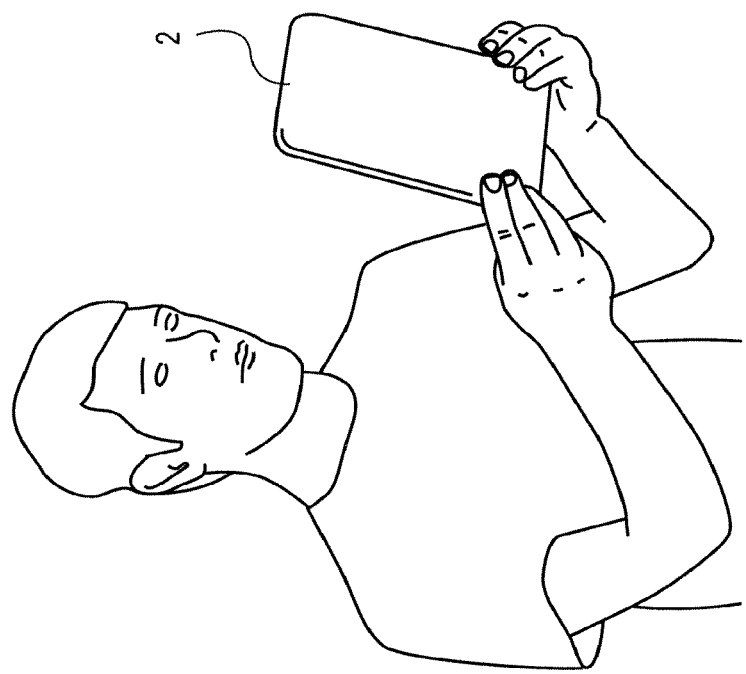
FIG. 1 shows a human user holding different types of a multi-function handheld mobile communications device, namely a smart phone and a handheld tablet-like personal computer.
Figure 1:
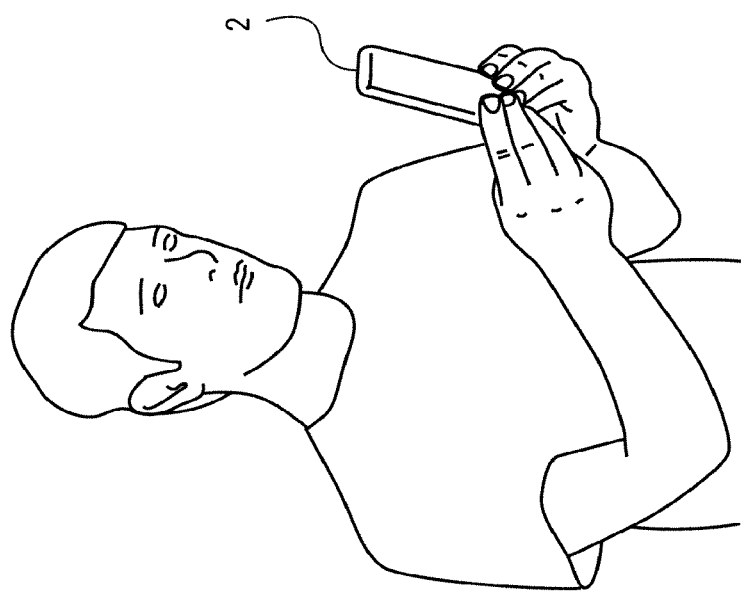

FIG. 1 shows two instances of a multi-function handheld mobile communications device 2 (also referred to here as a mobile communications device) held in the hands of an end user (owner) of the device 2. In one instance, the device 2 is a smart phone or a cellular phone with several features typically available in modern handheld wireless communication devices, such as a touch screen interface, music, video file recording, playback, digital camera, and wireless-enabled applications such as voice over internet protocol telephony, electronic calendar, web browser, and email. In another instance, the device 2 may be a larger, handheld tablet-like computer such as an iPad™ device by Apple Inc.

Figure 2:
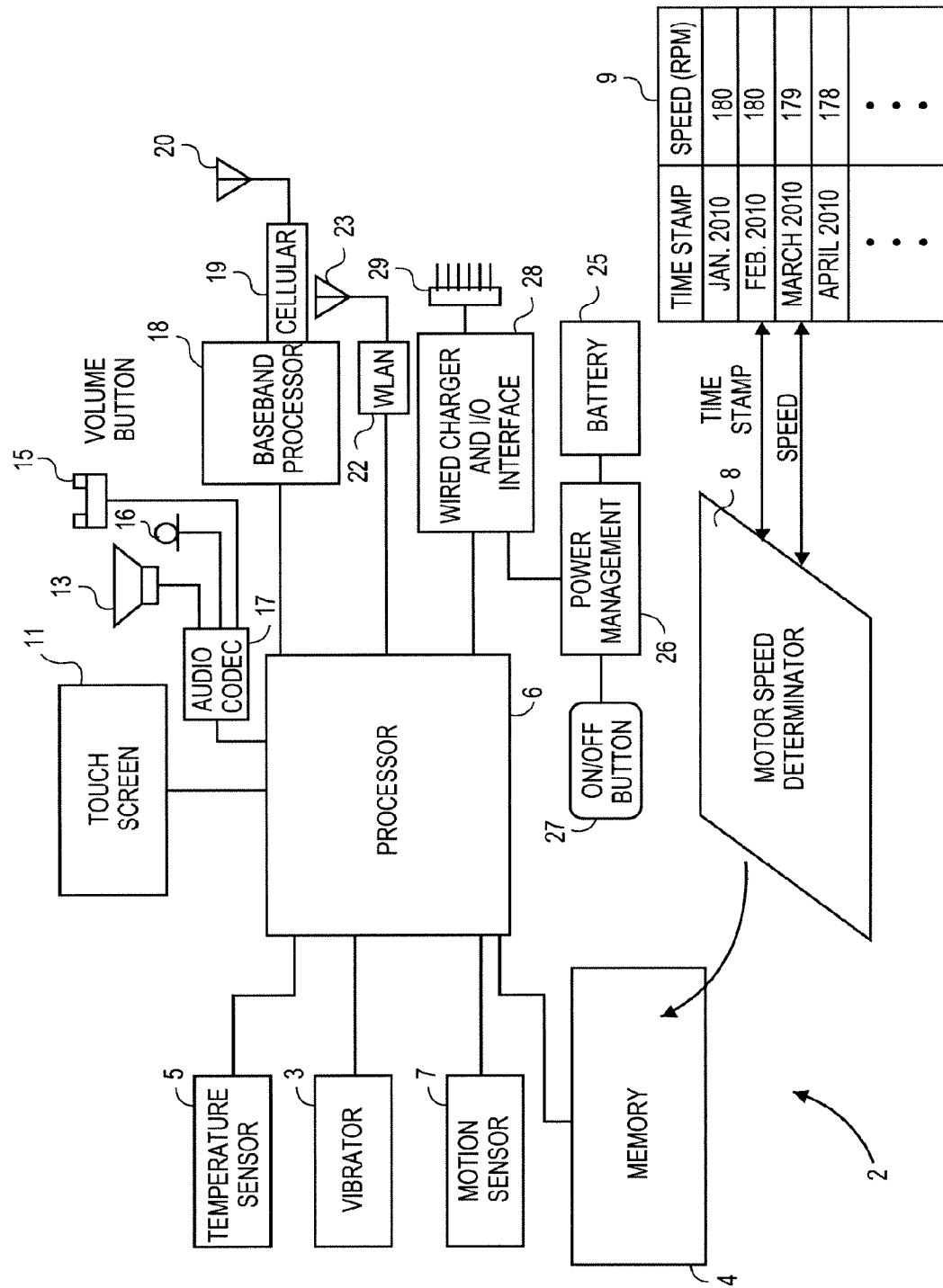
FIG. 2 is a block diagram of the constituent functional unit blocks and hardware components in an example multi-function handheld mobile communications device.

FIG. 2 shows a functional unit block diagram and some constituent hardware components of the mobile communications device 2, e.g. as found in an iPhone™ device by Apple Inc. Although not shown, the device 2 has a housing in which the primary mechanism for visual and tactile interaction with its user is a touch sensitive display screen (referred to here as a touch screen) 11. The housing may be essentially a solid volume referred to as a candy bar or chocolate bar types as in the iPhone device. An alternative is one that has a moveable, multi-piece housing, such as a clamshell design, or one with a sliding, physical keypad as used by other cellular and mobile handset or smart phone manufacturers. The touch screen 11 is used to display typical features of visual voicemail, web browser, email, and digital camera viewfinder, as well as others, and to receive input from the user via virtual buttons and touch commands.

For wireless telephony, which enables the user to receive and place audio and/or video calls, downlink audio during a call can be emitted from a speaker 13 (which may be an earpiece speaker or receiver, or it may be a headset earphone). Uplink audio includes the user's speech, which is picked up by a microphone 16 (e.g., mouthpiece microphone or headset microphone). Conversion between analog domain and digital domain for the speaker and microphone signals, in addition to digital audio signal processing for different applications running in the device 2, may be performed within audio codec 17. A physical volume switch or button 15 may also be connected to the codec. The codec 17 may be configured to operate in different modes, e.g. to service a digital media player function (such as an MP3 player that is playing back a music file that is stored in the device 2), as well as a wireless telephony function.

For wireless telephony, a baseband processor 18 is included to perform speech coding and decoding functions upon the uplink and downlink signals, respectively, in accordance with the specifications of a given protocol, e.g. cellular GSM, cellular CDMA, wireless VOIP. A cellular transceiver 19 receives the coded uplink signal from the baseband processor and up converts it to a carrier band before driving an antenna 20 with it; it receives a downlink signal from the antenna 20 and down converts the signal to baseband before passing it to the baseband processor 18. A wireless local area network transceiver 22 receives and transmits data packets from a nearby wireless router or access point, using an antenna 23.

Power is provided to operate the components shown in FIG. 2 by a battery 25 (generically used here to refer to a rechargeable power source that may also include a rechargeable fuel cell). The battery 25 is charged or replenished by an external power source such as a wall plug or automobile battery dc power adapter (not shown) that connects to a multi-pin docking connector 29 that is also integrated in the housing of the device 2. The connector 29 and its associated charger and I/O interface circuitry 28 may be in accordance with any suitable computer peripheral specification such as Universal Serial Bus (USB). The USB protocol allows for the connector 29 and its associated interface 28 to be used for both power transfer to recharge the battery 25 and for data I/O communications. The latter includes docking functions, to synchronize user content in the device 2 with another computer device owned by the user that may have substantially more data storage capacity, e.g. a desktop computer, a laptop/notebook computer.

The personal mobile communications device 2 may include a power management unit (PMU) 26. The PMU 26 is typically implemented as a programmed processor, with associated analog and digital conversion circuitry, analog signal conditioning circuitry, and a data communications interface needed to control or communicate with other components of the device 2 (for purposes of thermal management). The PMU 26 obtains temperature data (or temperature readings) from multiple temperature sensors, and then processes that data to make decisions that affect power consumption activity, in order to maintain specified thermal levels for the device 2. The PMU 26 may include power supply circuitry with various regulated voltage outputs for supplying power to the components of the device 2. The PMU 26 may also be tasked with the orderly powering down and powering up the various components of the device 2, in response to system reset or the main power on/off switch 27 being actuated by the user.

The device 2 also includes a motion sensor 7 which may use an accelerometer to measure linear acceleration of the device 2 along a given axis. Motion sensor 7 may use a MEMS type mechanical sensor to measure turn rate or angular velocity of the device 2 about a given axis. Motion sensor 7 may be integrated with a vibrator 3 on the same integrated circuit die or alternatively in the same integrated circuit package.

The user-level functions of the device 2 are implemented under control of a processor 6 that has been programmed in accordance with instructions (code and data) stored in memory 4. The processor 6 and memory 4 are generically used here to refer any suitable combination of programmable data processing components and data storage that conduct the operations needed to implement the various functions of the device. The processor 6 may be an applications processor typically found in a smart phone, while the memory 4 may refer to microelectronic, non-volatile random access memory. An operating system may be stored in the memory 4, along with application programs specific to the various functions of the device, which are to be run or executed by the processor 6 to perform the various functions of the device 2. For instance, there may be a telephony application that (when launched, unsuspended, or brought to foreground) enables the user to "dial" a telephone number to initiate a telephone call using wireless VOIP or a cellular protocol and to "hang up" on the call when finished.

Referring again to FIG. 2, device 2 includes an integrated motion sensor 3, which is generally configured according to a fixed vibrator geometry including a motor body with a rotating counter-weight. Due to the generally reduced size of a vibrator motor, vibrators may exhibit speed tolerance (variation) of, for example, plus or minus 20 percent. During high volume manufacturing (HVM), HVM manufacturers of mobile communications devices, such as device 2, have difficulty quantitatively measuring the performance of a vibrator due to the significant variations of speed tolerance between different vibrator motors.

In one embodiment, a vibrator motor speed is initially determined by a manufacturer during initial manufacturing of a mobile communications device to perform an initial calibration or check of the motor and its associated control electronics. This initial, baseline vibrator motor speed may be used to initially reject the vibrator motor depending on the variation of speed tolerance from an expected speed value. Presuming the speed of the vibrator motor, prior to integration, is acceptable, the vibrator motor is integrated into the mobile communications device, such as device 2 shown in FIG. 2. Subsequently, the vibrator motor speed may be determined while integrated within the mobile communications device.

As shown in FIG. 2, motion sensor 7 is communicably coupled to vibrator 3. A motion sensor of device 2, shown in FIG. 2, is generally provided for functions other than sampling detected vibration of vibrator 3. As a result, motion sensor 7 is an available device within mobile communications device 2 of FIG. 2. In one embodiment, motion sensor 7 includes a test mode in which motion sensor 7 is used to sample detected vibration from vibrator 3 being given in the mobile device, making testing much more cost effective both at the time of manufacturing test and in-the-field. In one embodiment, processor 6 may be programmed in accordance with motor speed determinator program module 8 (which may be stored in memory 4) to achieve such a result.

Still referring to FIG. 2, motor speed determinator module 8 produces stored vibrator motor speeds to enable processor 6 to detect a degradation of vibrator motor performance. According to motor speed determinator module 8, processor 6 may sample an output of motor sensor 7 while vibrator 3 is running. Processor 6 may analyze the sampled output data to detect the vibration caused by the running motor and to determine a speed of the vibrator motor. As shown in FIG. 2, the vibrator motor speed and a time stamp may be stored within table 9 or other like non-volatile memory. Periodically, for example, or in response to detected vibration, processor 6 may analyze stored speeds of the vibrator motor to detect when vibrator motor speed performance has degraded during in-the-field use.

Figure 3:
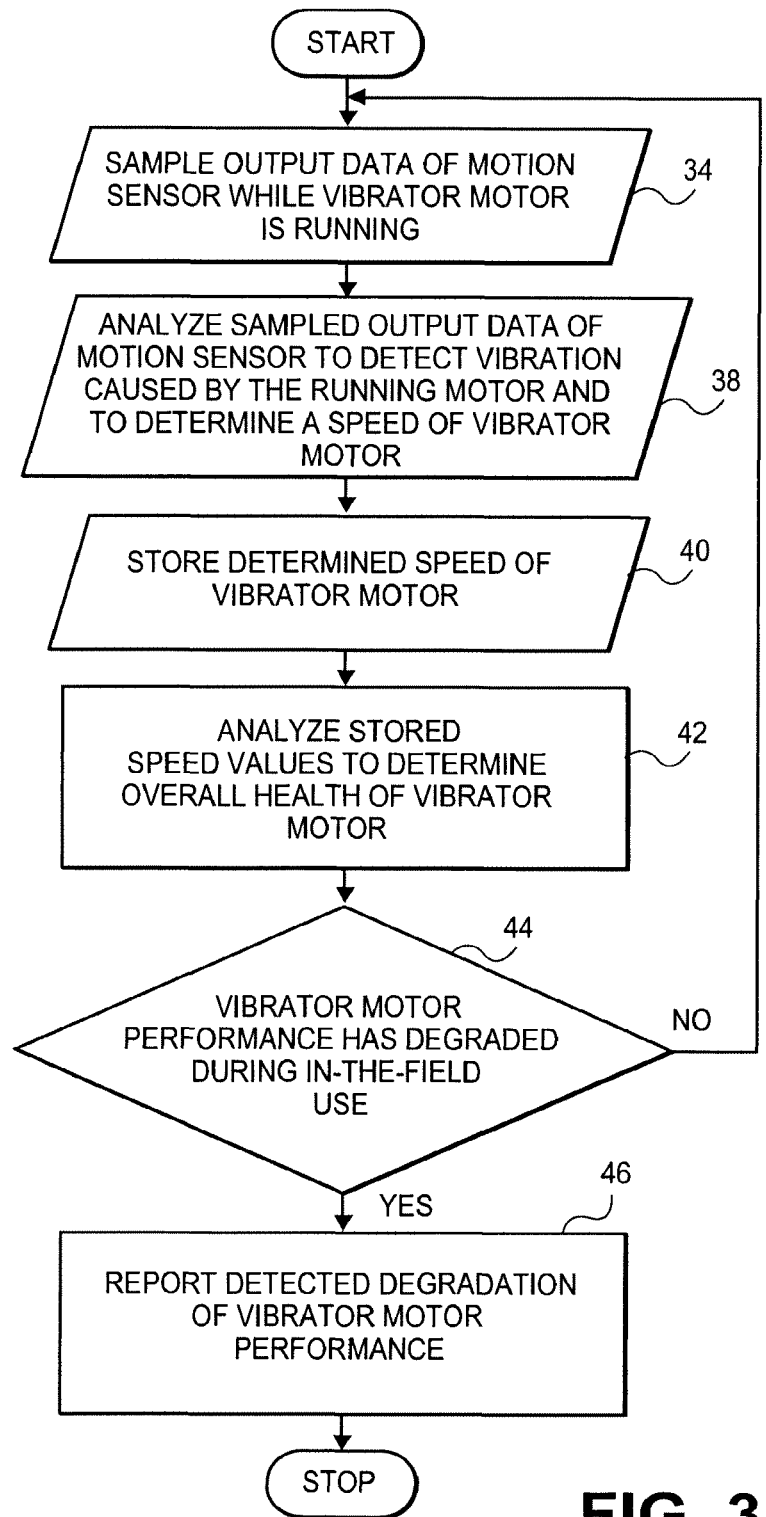
FIG. 3 is an algorithm or process flow for vibrator motor speed determination.

In response to analyzing stored speeds of the vibrator motor, processor 6 may report a degradation of vibrator motor performance. A report may be in the form of an audio or visually alert being given in the mobile device (e.g., a pop-up window appearing on the display screen of the device with explanatory text) that notifies the user to service the mobile communications device. In one embodiment, an alert message may be generated and transmitted to a manufacturer service center, via a wireless network connection, to alert the service center of a detected degradation requiring service of the mobile communications device. Alternatively, the processor may communicate the stored speed values to a service center to enable the service center to detect if a degradation of vibrator motor performance has occurred during in-the-field use. FIG. 3 shows an algorithm for such a process.

The algorithm may begin with the programmed processor automatically sampling, during in-the-field use of mobile communications device 2, output data of a motion sensor while a vibrator motor is running. This is depicted in block 34 where output data of the motion sensor is sampled while a vibrator motor is running. For example, samples from an output of an accelerometer may be taken while the vibrator is active, which may be referred to herein as a "vibrator event".

In one embodiment, the output data of the motion sensor may indicate a detected vibration caused by the running motor that is used to determine a speed of the vibrator motor (block 38) and the vibrator motor speed is stored (block 40). Note also that in block 34, as part of the sensor readout operation, a smoothing function may be applied to a short sequence of raw output values from the sensors to obtain a single, representative value. For instance, the actual output data that is evaluated or used in a subsequent operation below may be an average of several samples taken from the respective sensor, so as to smooth out the effects of noise in instantaneous readings from the sensors, or to ensure that the raw values are reasonably stable before using them.

As shown in operation 40, the vibrator motor speed and time stamp may be written to lookup table 9 to enable a quantitative measurement of vibrator motor performance during in-the-field use. If the vibrator motor speed is associated with a new speed value, that is, one not previously existing in the table, then this is considered a new value and is therefore written into a new entry (together with a time). On the other hand, if the speed value from block 38 matches a preexisting speed value in the lookup table, then operation 40 essentially updates or overwrites an old speed value of that entry in the table 9. The process then may repeat with blocks 34-42, if there is a detected vibration event to further populate the entries in the lookup table. For instance, the process in FIG. 3 may be repeated each time a significant period of time has elapsed since the table 9 was deemed to be complete, so as to ensure that any drifts or variations in performance of the vibrator 3 are recaptured to detect any possible degradation. The process may also be triggered when the table 9 does not yet have sufficient coverage for the full, expected operating range of the vibrator 3.

Still referring to FIG. 3, the programmed processor 6 may also perform an analysis on read motion sensor output, to determine an overall health of the vibrator motor (block 42) decide when stored speed values within the lookup table indicate a degradation of vibrator motor performance during in-the-field use (block 44). While the operation in block 40 is not necessary in all instances, it does help prevent the table 9 from being populated with possibly corrupt values or clearly incorrect values, especially since the process of FIG. 3 is being performed in-the-field essentially inconspicuous to the end user, and thus may be subject to unexpected events that could interfere with operation of the motion sensor.

Figure 4:
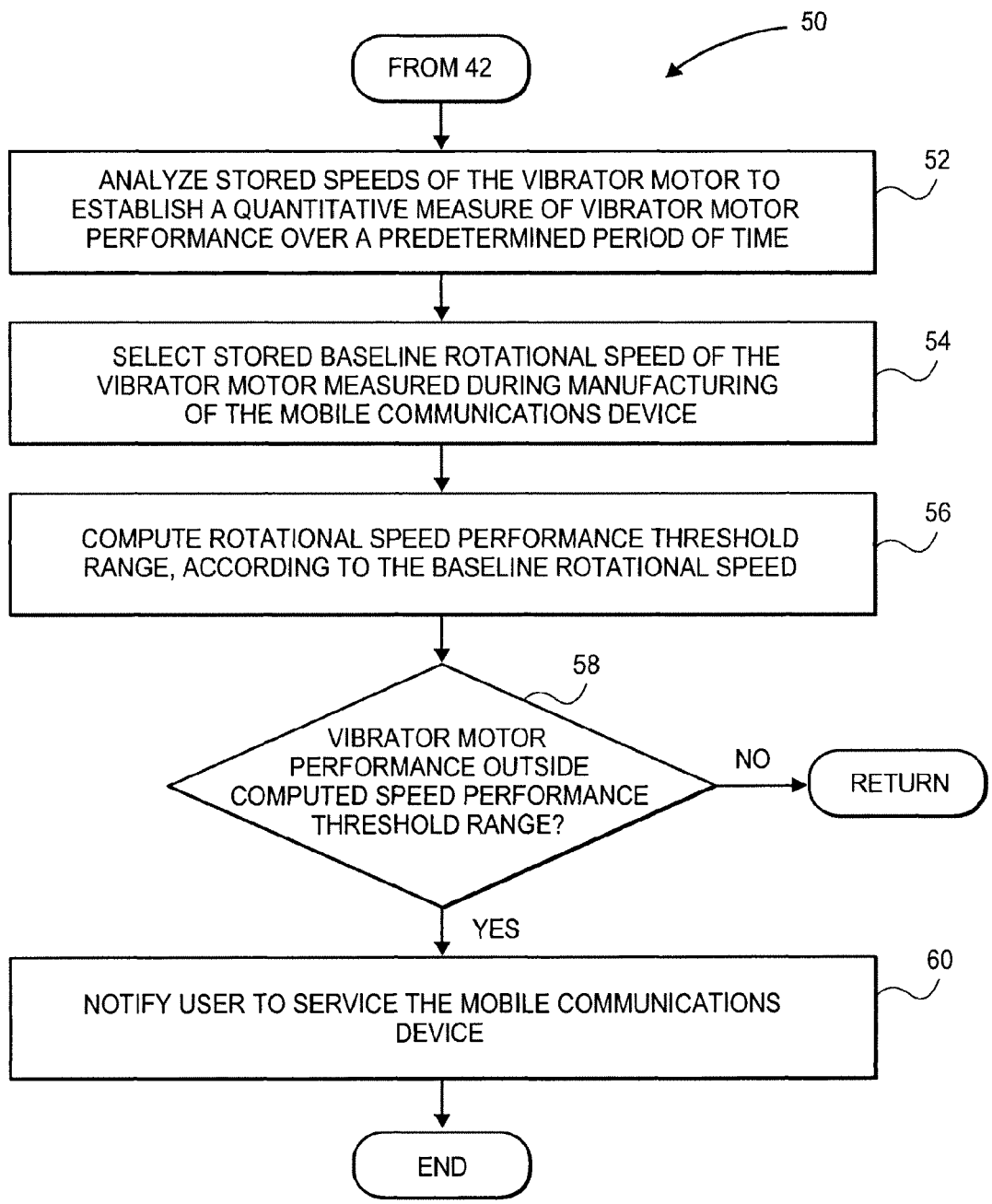
FIG. 4 is an algorithm or process flow for performing a vibrator motor speed determination.

Representatively, if a degradation of vibrator motor performance is detected (block 44), then operation proceeds with block 46 to report the detected degradation of vibrator motor performance. If, however, a vibrator motor performance degradation check indicates a normal operation, then one or more of the prior operations depicted in FIG. 3 should be repeated. For instance, the output data of the motion sensor may be re-sampled through operation 34 and subjected to the vibrator motor performance degradation check again, to make sure that any degradation of vibrator motor performance is detected and reported. FIG. 4 shows an algorithm for the vibrator motor performance degradation check process.

Referring to FIG. 4, operation of flowchart 50 begins with block 52 in which stored speeds of the vibrator motor are analyzed to establish a quantitative measure of vibrator motor performance over a predetermined time. Once the vibrator motor performance over a predetermined time is established, this quantitative measure is analyzed to determine a health of the vibrator motor, and depending on the health of the vibrator motor, whether the vibrator motor performance is degrading. As shown in block 54, a baseline speed of the vibrator motor may be selected. In one embodiment, the baseline rotational speed of the vibrator motor is measured during manufacturing of the mobile communications device. This base time value may be stored in the table 9 as shown in FIG. 2.

The baseline rotational speed may be used to compute the rotational speed performance threshold range which is shown at block 56. The computation of the speed performance threshold range for the device may be performed by the initial device manufacturer or may be performed by the mobile communications device, depending on the desired implementation. Based on this performance threshold, it may be determined whether the vibrator motor performance is below or falls below or outside the computed speed performance threshold as shown at block 58. If the vibrator motor performance is in line with the predetermined performance threshold, control flow of the process returns, as indicated by the "No" branch (block 58). Otherwise, a performance degradation is detected which is communicated to the user as shown at block 60, where the user is notified to service the mobile communications device.

In one embodiment, a determined vibrator motor speed is compared to preexisting vibrator motor speeds in the table 9, to determine whether the determined vibrator motor speed is significantly different than one or more pre-existing speed values. In one case, the comparison is made with a baseline speed that was written to the table 9 in the factory. In other words, the in-the-field speed values are checked against a threshold value that was determined at the factory during a manufacturing test, for example, that was under well-controlled conditions (resulting in an acceptance baseline speed value.)

If the in-the-field speed values are significantly different than a preexisting value from the table 9, then operation may proceed with block 72 to determine whether the in-the-field speed value indicates a performance degradation. This may be the situation where stored speed values are quite different than those already in the table 9. An interpolation or extrapolation procedure may be performed to determine a performance threshold range, for instance based on a baseline speed that was written to the table 9 in the factory or the preexisting data in the table 9. If the stored speed values are not close enough to the estimated performance threshold range, then it is likely that the vibrator operation is degrading and the user is notified to service the mobile communications device (block 60).

In the embodiments described, vibrator motor performance is based on the determined or measured speed values of a vibrator motor. A predetermined speed performance threshold range in one embodiment may be computed as part of an interpolation or extrapolation procedure to determine a performance threshold range based on the baseline speed that was written to table 9 in the factory. The baseline speed may be based on the speed measured for the motor at the factory. Alternatively, the baseline speed may be the expected speed for the type of vibrator motor included in the mobile communications device.

Depending on the baseline speed, the interpolation/extrapolation procedure may compute an acceptable range of variation from the baseline speed, which is not more than, for example, twenty percent (20%). While degradation in vibrator motor performance may be detected based on any variation from the baseline speed, the reported degradation, in one embodiment, is reported when vibrator motor performance falls outside the predetermined performance threshold range. In one embodiment, the acceptable range of variation from the baseline speed may be selected by a user such that the vibrator motor performance degradation check is performed by the mobile communications device.

Still referring to FIG. 4, and returning to operation 58, if the read vibrator motor speed are close enough to preexisting speed values, then a decision should be made next as to whether the preexisting pair in the table 9 needs to be updated or overwritten. For instance, each entry in the lookup table may be tagged with a date, such that if an entry is deemed to be old, then it should be updated or overwritten with a new reading. In that case, the process in FIG. 3 indicates that a current value should be written to the lookup table (operation 40). The latter result is also obtained if the speed value is close enough to an estimated speed value. Finally, there may be instances where the vibrator motor so closely match a preexisting speed in the lookup table that there is no need to update the table.

Figure 5:
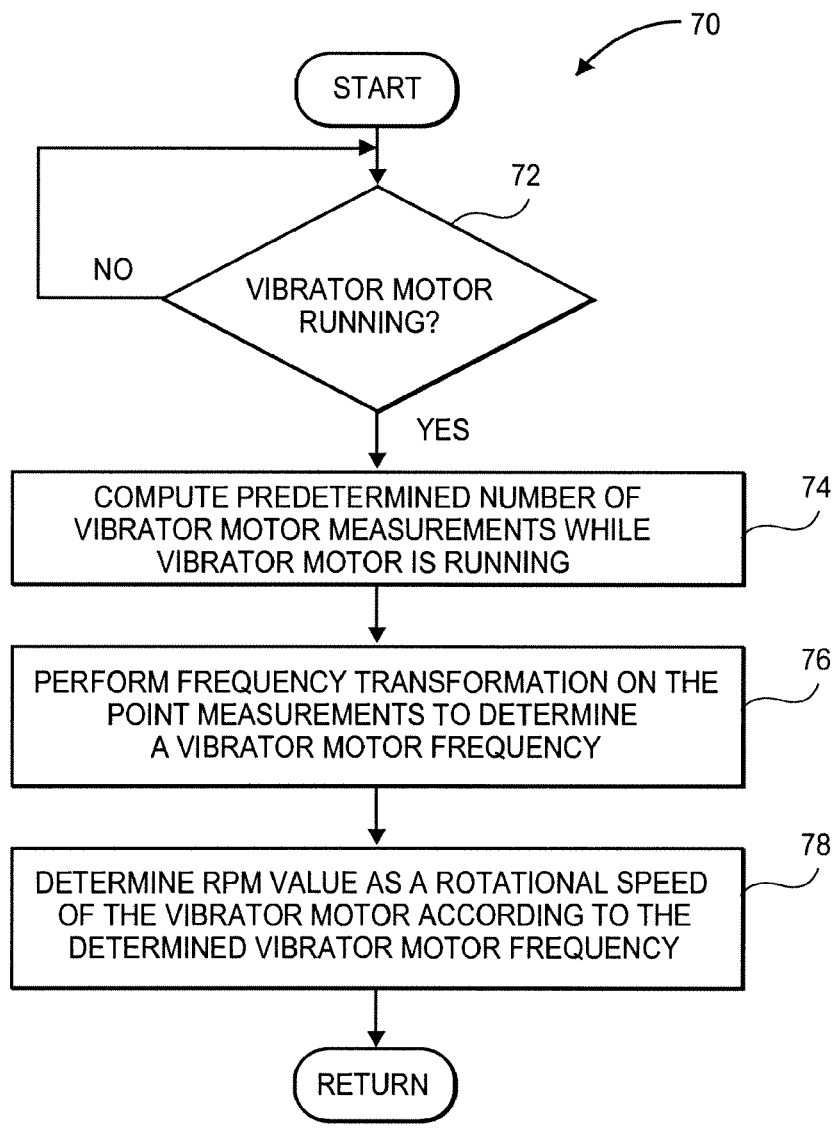
FIG. 5 is an algorithm or process flow for further performing a vibrator motor speed determination.

FIG. 5 is a flowchart 70 illustrating a method for determination of a vibrator motor's speed according to one embodiment. Representatively, at block 72, it may be determined whether a vibrator motor is running. As indicated above, running of a vibrator motor may be referred to as a vibration event, which may result in the use of a motion sensor that is integrated within a mobile communications device to measure a resonance of the vibrator motor causing the event. A speed of the vibrator motor may be computed based on the measured resonance of the vibrator motor.

As shown in block 74, a predetermined number of vibrator measurements may be computed. In one embodiment, in response to running of a vibrator motor at block 72, a motion sensor may be placed into a test mode in which a sampling rate of the motion sensor is increased to a predetermined sampling rate that is greater than sampling weight of the motion sensor getting normal operation. For example, the motion sensor may be increased to a 1 kHz sampling rate. For example, as shown at block 74, at a sampling rate of 1 kHz, 1024 point measurements may be taken at the 1 kHz sampling rate.

Figure 6:
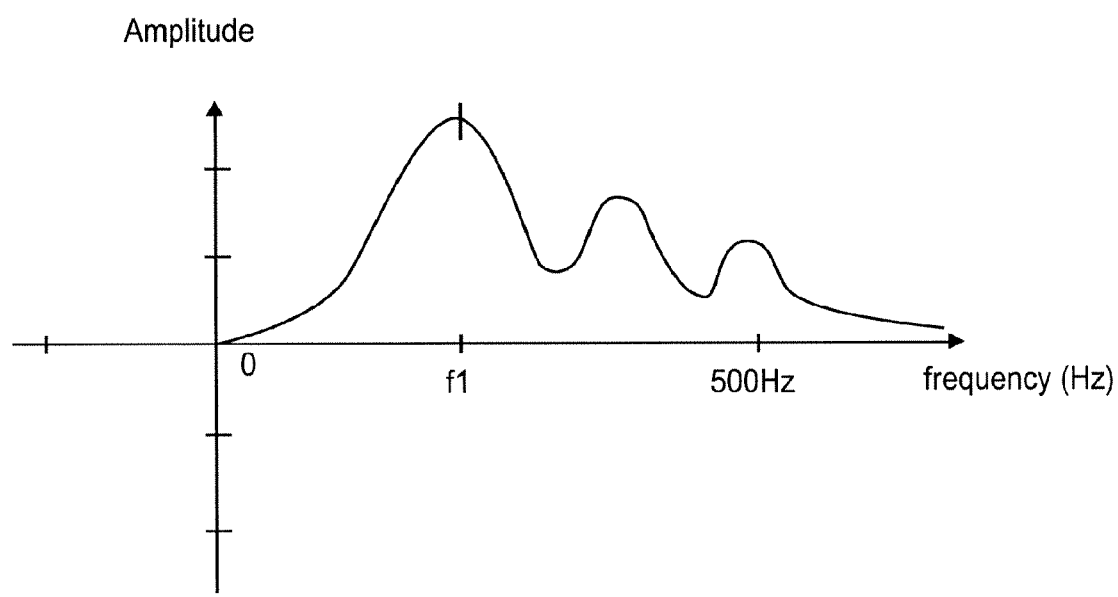
FIG. 6 is a graph of a vibrator motor frequency versus amplitude.

Referring again to FIG. 5, at block 76, a frequency transformation may be performed on the point measurements to determine a vibrator motor frequency. In one embodiment, the frequency transformation may be performed based on an amplitude/frequency graph, as shown in FIG. 6. Representatively, the fast fourier transformation (FFT) on the data is used to obtain a frequency spectrum of the vibration. Representatively the frequency spectrum may indicate a frequency F1 as well as subsequent harmonic values, such that the frequency F1 is determined as the frequency of the vibrator motor. Based on the determined frequency of the vibrator motor, the revolution per minute (RPM) value may be determined as a rotational speed of the vibrator motor, for example, multiplying the frequency according to equation to one.

$$RPM = F1 * 60 \quad (1)$$

Although described with reference to frequency, a speed value may be assigned to the vibrator motor based on an amplitude of the amplitude versus frequency graph of FIG. 6. As further described herein, a speed of the vibrator motor may be, for example, a rotational speed such as the revolution per minute value. It should be noted, however, that the speed value of a vibrator motor may also include linear vibrators as well as the rotary vibrator described. In the example described, an accelerometer sampling at 1 kHz can complete the predetermined number 1024 point measurements described at block 74 within one second. Using the FFT on the data quickly determines a frequency of the vibrator motor which is used to calculate an RPM value. This RPM value is then stored within a table in combination with a time stamp. The process of FIG. 5 may be repeated for each vibration event.

After a predetermined period of time, or in response to a predetermined number of stored vibrator motor speeds, the vibrator motor speeds may be analyzed to determine the health of the vibrator motor and to detect when the vibrator motor performance has degraded below a predetermined threshold. Similarly, a mobile communications device, as described, may simply store the measured speed values within the table, which are then analyzed by a technician when the mobile communications device is serviced. Based on the in-the-field use measurements, a variation of the vibrator motor speed overtime may be analyzed to determine whether the motor is degrading over time. Based on the degree of degradation, the vibrator motor may require replacement. Accordingly, based on an analysis of stored speeds of the vibrator motor, a notification of a degradation of vibrator motor performance is sent to either a manufacturer or user of the mobile communications device.

Variable Control of Vibration

In a linear type vibrator, a weight hung by springs is excited by a magnetic field. These types of vibration motors may have a very narrow range of operation in terms of the frequency used to drive them because the drive frequency should coincide with the natural resonance of the linear motor. The range of operation in terms of frequency is dependent unit to unit over manufacturing tolerances, as well as unit orientation, temperature, air pressure, etc. for the optimal drive frequency.

In one embodiment, during a vibration event, an accelerometer is used as feedback while quickly sweeping the frequency of the vibrator driver looking for the max vibration. In one embodiment, a drive motor frequency corresponding to the maximum vibration frequency, such as a maximum vibration force, is selected and driving of the motor is performed at that frequency to achieve variable control of the vibration. In one embodiment, a predetermined vibration force may correspond to a vibration frequency in the range of 100 Hz to 200 Hz.

In one embodiment, an optimal resonance of a linear vibrator is determined by sweeping the drive frequency on the linear vibrator (e.g., 100 Hz to 200 Hz). During the sweep, a fast Fourier transform may be applied to the sampled output data sequence from an integrated accelerometer, and the resulting frequency spectrum is analyzed to determine the frequency of the vibration. A peak magnitude of the fundamental frequency may also be identified as the vibrator frequency sweeps to determine the optimal (strongest) vibration force. A manufacturer of a linear vibrator could have different resonance frequencies sweeping low to high or high to low. It is beneficial to sweep vibrator frequency in both directions to measure rising and falling frequency resonance. In one embodiment, a calculated average resonance frequency, based on the measured rising and falling frequency resonance, is selected as the optimal frequency to drive the linear vibrator.

As explained above, an embodiment of the invention may be a machine-readable medium (such as microelectronic memory) having stored thereon instructions, which program one or more data processing components (generically referred to here as a "processor") to perform the vibrator motor speed determination processing operations described above, including reading from and writing to a vibrator motor speed lookup table. In other embodiments, some of these operations might be performed by specific hardware components that contain hardwired logic (e.g., dedicated state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

We claim:

1. A method within a mobile communications device, comprising:
    operating a linear vibrator motor at a set of distinct rising and falling drive frequencies;
    measuring vibrations of the linear vibrator motor caused by the set of distinct rising and falling drive frequencies using a motion sensor;
    analyzing the measured vibrations, by a processor of the mobile communications device, to detect:

a rising resonance frequency selected from the measured vibrations during the set of distinct rising drive frequencies; and
a falling resonance frequency selected from the measured vibrations during the set of distinct falling drive frequencies;
determining a resonance frequency of the linear vibrator motor using the detected rising and falling resonance frequency; and
driving an actuator of the linear vibrator motor at the detected resonance frequency.

2. The method of claim 1, wherein the resonance frequency is between 100 Hz and 200 Hz.

3. The method of claim 1, wherein the driving of the actuator of the linear vibrator motor at the resonance frequency coincides with a natural resonance frequency of the linear vibrator motor.

4. The method of claim 1, wherein the detecting of the resonance frequency further comprises identifying a peak magnitude of the resonance frequency.

5. A mobile communication device comprising:
a linear vibrator motor;
a motion sensor coupled to the linear vibrator motor, the motion sensor configured to measure vibrations of the linear vibrator motor while operating the linear vibrator motor across multiple drive frequencies; and
a control circuitry coupled to the linear vibrator motor, the control circuitry configured to:
analyze the vibrations of the linear vibrator motor, using a frequency domain transform, to detect:
a rising resonance frequency based on vibrations measured while sweeping drive frequencies of the linear vibrator motor from low to high; and
a falling resonance frequency based on vibrations measured while sweeping drive frequencies of the linear vibrator from high to low;
determine a resonance frequency of the linear vibrator motor based on the detected rising and falling resonance frequencies; and
drive an actuator of the linear vibrator motor at the detected resonance frequency.

6. The mobile communication device of claim 5, wherein the motion sensor is an accelerometer.

7. The mobile communication device of claim 5, wherein the resonance frequency is based on at least one of the orientation of the linear vibrator motor, an ambient temperature of the linear vibrator motor, or an ambient air pressure of the linear vibrator motor.

8. The mobile communication device of claim 5, wherein the detecting of the resonance frequency by the control circuitry further comprises:
identifying a peak magnitude of the resonance frequency, wherein the peak magnitude of the resonance frequency includes a maximum vibration force of the linear vibrator motor during the vibration event.

9. The mobile communications device of claim 5, wherein:
the motion sensor is further configured to measure an amplitude of the measured vibrations; and
the control circuitry is further configured to determine a rotational speed of the linear vibrator motor using the measured amplitude.

10. The mobile communications device of claim 9, wherein the control circuitry is further configured to identify a degradation condition of the linear vibrator motor by comparing the determined rotational speed with a baseline value.

11. The mobile communications device of claim 10, wherein the control circuitry is further configured to drive the actuator of the linear vibrator motor at the detected resonance frequency upon the identification of the degradation condition.

12. An electronic device comprising:
a non-transitory machine-readable storage medium that stores instructions which, when executed by a processor in the electronic device, is configured to:
in response to a detected degradation of vibrator motor performance, measure vibrations of the linear vibrator motor using a motion sensor while operating the linear vibrator motor at multiple ones of a set of predetermined drive frequencies;
sample an output data of the motion sensor that is integrated in the electronic device;
analyze the output data to detect:
a rising resonance frequency selected from the measured vibrations while sweeping the linear vibrator motor from low to high;
a falling resonance frequency selected from the measured vibrations while sweeping the linear vibrator motor from high to low;
determine an average resonance frequency based on the detected rising and falling resonance frequency; and
drive an actuator of the linear vibrator motor at the detected resonance frequency.

13. The electronic device of claim 12, comprising further instructions that when executed by the processor in the electronic device is configured to:
drive the actuator of the linear vibrator motor at a natural resonance frequency of the linear vibrator motor,
wherein the detected resonance frequency coincides with the natural resonance frequency.

14. The electronic device of claim 12, comprising further instructions that when executed by the processor in the electronic device is configured to:
identify a peak magnitude of the resonance frequency,
wherein the peak magnitude of the resonance frequency includes a maximum vibration force of the linear vibrator motor during the vibration event.

15. The electronic device of claim 12, wherein the resonance frequency for the linear vibrator motor changes when the linear vibrator motor performance has degraded.

16. The electronic device of claim 12, comprising further instructions that when executed by the processor in the electronic device are configured to:
generate a notification corresponding to the detected degradation; and
transmit the notification to an interconnected computing device.

* * * * *